July 16, 1940.  O. J. MORELOCK  2,208,329
VACUUM TUBE VOLTMETER
Filed May 7, 1937  2 Sheets-Sheet 2
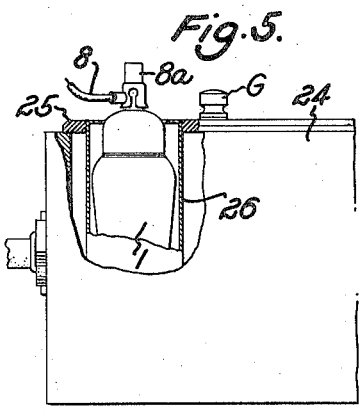
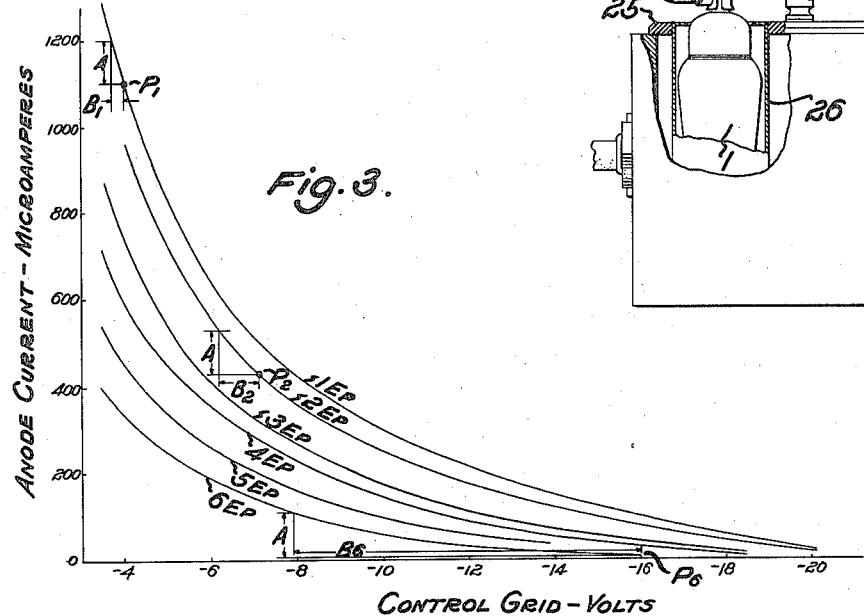
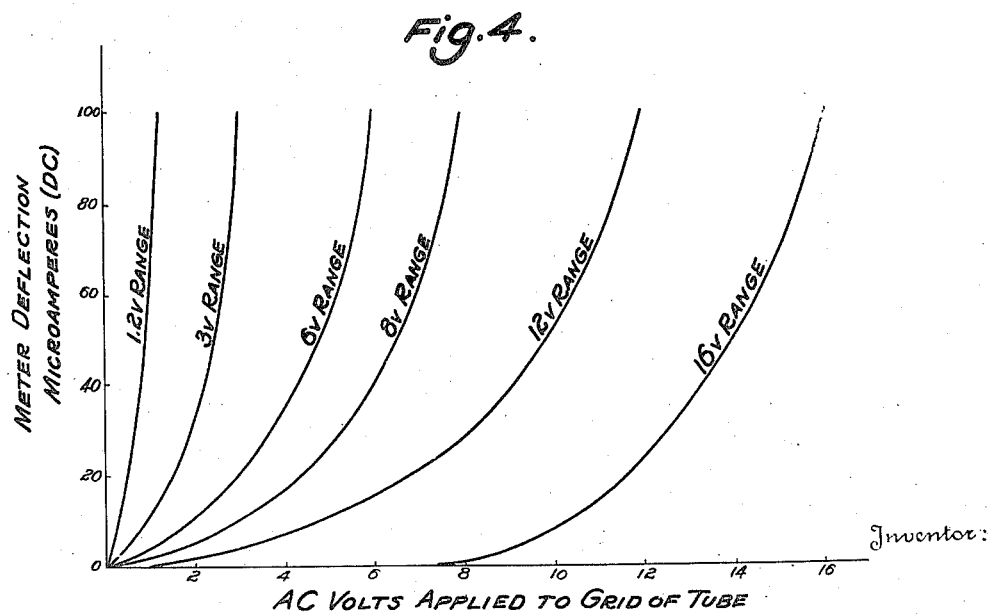

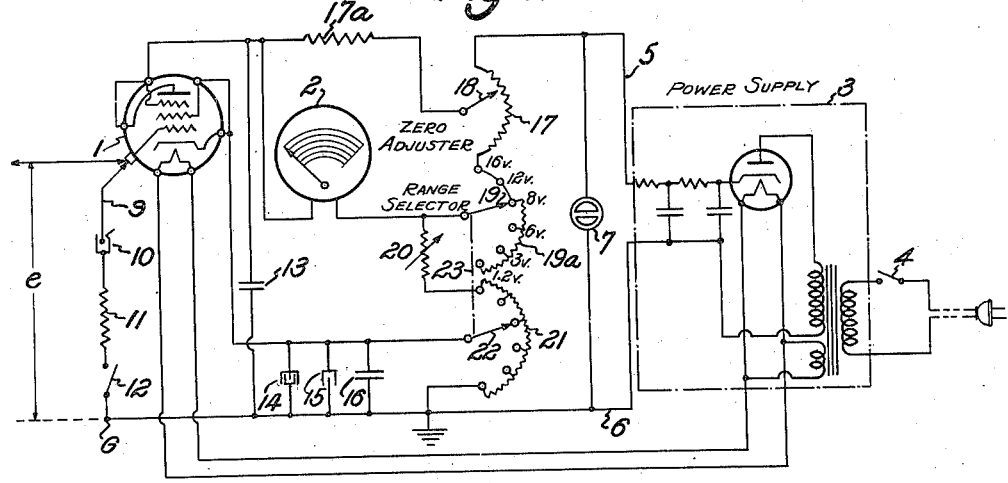

Patented July 16, 1940

2,208,329

UNITED STATES PATENT OFFICE 2,208,329

VACUUM TUBE VOLTMETER

Oliver James Morelock, Short Hills, N. J., assignor to Weston Electrical Instrument Corporation, Newark, N. J., a corporation of New Jersey Application May 7, 1937, Serial No. 141,359

20 Claims. (Cl. 171—95)

This invention relates to vacuum tube voltmeters and more particularly to multirange vacuum tube voltmeters.

Various circuit arrangements have been proposed for vacuum tube voltmeters but, in general, the prior devices have been designed to measure only a single range of voltage. Multiplier systems in the form of resistance voltage dividers were employed in measuring voltages above the normal range of the vacuum tube voltmeter, but such arrangements are open to the objection that the operating characteristics of the circuit under measurement may be altered when shunted by the voltage divider. Another prior design omitted the voltage divider and provided two ranges of measurement by altering the circuit connections to a triode tube, the tube being operated as a triode on the low voltage range and as a diode on the higher voltage range. This apparatus was of relatively low sensitivity as the full scale deflection on the low range was four volts, and the system did not operate as a true vacuum tube voltmeter on the higher range as an appreciable current was required to obtain a reading when the tube functioned as a rectifier.

A voltage range of the order of from 1 to 150 may be encountered in the testing of a single piece of electrical equipment, for example a superheterodyne radio receiver. It is apparent that values within a voltage spread of this order cannot be measured accurately with a single range vacuum tube voltmeter, and that apparatus of the true vacuum tube type cannot be constructed with a voltage divider which, obviously, must draw some current from the circuit under investigation.

An object of this invention is to provide a vacuum tube voltmeter that will accurately measure voltages over two or more ranges without drawing current from or disturbing the normal operating characteristics of the circuit under investigation. An object is to provide a multirange vacuum tube voltmeter which includes a single measuring instrument of the sensitive moving coil galvanometer type, and a vacuum tube of the variable mu or remote cut-off type, the apparatus being characterized by its freedom from range-selecting circuit elements which place a load upon the circuit under investigation. Further objects are to provide a multirange vacuum tube voltmeter having a substantially uniform response over a frequency range of the order of from 40 cycles up to 50 megacycles and a uniform capacity across the input terminals at all ranges. More specifically, an object is to provide a multirange vacuum tube voltmeter including a variable mu tube and a microammeter, a system for energizing the tube under predetermined voltage conditions in spite of fluctuations in the voltage of an alternating current supply source, an adjustable resistance network for varying the energizing voltages applied to the tube electrodes to determine the operating range of the apparatus, and an adjustable bucking circuit for setting the microammeter reading to zero at zero input voltage on each range, whereby the apparatus affords a direct reading of voltages on any and all ranges.

These and other objects and advantages of the invention will be apparent from the following specification when taken with the accompanying drawings in which:

Fig. 1 is a wiring diagram of an embodiment of the invention;

Fig. 2 is a plan view of a voltmeter employing the circuit of Fig. 1;

Fig. 3 is a curve sheet showing a family of curves depicting the relationship between total space current and grid voltage for the tube used in one embodiment of the invention;

Fig. 4 is a curve sheet showing the meter deflection at each measuring range as a function of the input alternating current voltage; and Fig. 5 is a fragmentary sectional view showing the mounting of the relative arrangement of the amplifier tube and control panel.

The particular apparatus that will be described as an example of the invention was designed to cover the range of from about 0.1 volt to 16 volts in six ranges; the full scale reading of the several ranges being 1.2, 3, 6, 8, 12 and 16 volts, respectively. This equipment is useful in checking the operation of superheterodyne radio receivers, but neither this voltage spread nor the number of ranges is an essential feature of the invention.

In the drawings, the reference numeral 1 identifies a variable mu vacuum tube upon which the unknown voltage e is impressed to develop a space current flow that is measured by the microammeter 2. Power for energizing the tube is derived from the usual light circuit of 105–130 volts, 60 cycle type through a power supply unit 3, an on-off switch 4 being preferably included in the supply leads. The positive potential lead 5 and the ground lead 6 from the power supply are shunted by a neon regulator tube 7 which maintains the direct current voltages on the tube independent of fluctuations in the supply voltage.

The plate and screen grid of the tube 1 are directly connected, and the suppressor grid is joined to the cathode. The microammeter is so connected in the plate circuit, as will be described in detail, that a reverse current through the instrument brings the reading to zero position for a zero input voltage. Tubes of the type 78 have proved satisfactory when the microammeter 2 is designed for a full scale deflection at 100 microamperes. The terminal G on the ground lead 6 provides one connection to the network under investigation, and the other connection preferably takes the form of a flexible lead 8 having an elongated sleeve terminal 8a which fits upon the control grid cap of tube 1, and a spring terminal 8b for clamping to the network. A grid bias return is provided by the removable lead 9, pin jack 10, resistor 11 and switch 12 when the circuit under investigation is non-conductive. Lead 9 has a grid clip which fits upon the terminal 8a and, when the tested circuit is conductive, the lead 9 may be removed from the tube 1 and jack 10, thus reducing the input capacitance of the tube to a minimum.

The plate circuit is by-passed for alternating current by a condenser 13, and the cathode is by-passed to the ground lead 6 by three condensers in parallel, condenser 14 being an electrolytic condenser for by-passing low frequencies, condenser 15 a paper condenser for by-passing high frequencies, and condenser 16 a low-loss mica condenser for by-passing ultra-high frequencies.

According to this invention, the operating range of the vacuum tube voltmeter is determined by controlling the direct current voltages applied to the tube elements. Some or all of the energizing potentials may be changed in shifting from one range to another, depending upon the particular voltage ranges and the characteristics of the tube. The network shown in Fig. 1 effects a simultaneous adjustment of the plate voltage and the control grid bias, i. e. the positive potential impressed upon the cathode.

A voltage dividing path is formed between the positive lead 5 and negative or ground lead 6 of the power supply unit by a plurality of resistance elements. One side of the resistor 17 of a potentiometer is connected to the positive lead 5, and the sliding tap 18 of this potentiometer is connected through a fixed resistor 17a to the joined plate and screen grid of tube 1, also to the negative terminal of the microammeter 2. The other side of resistor 17 is connected to one end contact of a six point switch 19, the first three contacts being directly connected and the remaining three being connected through a resistance 19a. The contact arm of switch 19 is connected through an adjustable resistance 20 and a tapped resistance 21 to the ground lead 6. The taps of resistance 21 are connected to the contacts of a six point switch 22, and the contact arm of that switch is connected to the cathode of tube 1. The contact arms of switches 19 and 22 are mechanically connected, as indicated by the broken line 23, and the contact arm of switch 19 is connected to the positive terminal of the microammeter. Legends such as "16V", "12V", etc. are placed adjacent one of the switches to indicate the voltage range selected by the several adjustments of the switch arms.

The resistance elements and switches are so related that movement of the switches 19, 22 to select a lower voltage range (a clockwise adjustment as shown in Fig. 1) decreases the control grid bias by shifting the contact arm of switch 22 to a lower voltage tap, and increases the plate voltage. The increased plate voltage may result directly from the introduction of a part of resistance 19a into the resistance network when one of the three lower ranges is selected, or indirectly from the adjustment of the potentiometer 17, 18 to increase the reverse current through instrument 2 to bring the pointer into zero position. The normal space current flow increases as the control grid bias is decreased, and the slider 18 must therefore be set at a more positive value to increase the reverse current through the meter when the range selector switches are adjusted for a lower voltage range. The tube 1 is biased to or approximately to cut-off at the three upper ranges and the corresponding contact points 19 may therefore be directly connected as the potentiometer 17, 18 affords an adequate adjustment of the reverse current and plate voltage. The resistor 20 is not adjusted during normal operation but provides an adjustment for calibration of the voltmeter on the 16 volt range when the apparatus is first assembled or the tube 1 is replaced.

An assembly of the circuit elements in a portable unit is shown in Fig. 2. The parts are housed within a carrying case 24 that preferably has a removable cover, not shown, and the switches and controls are mounted on a panel 25. The knobs 18', 23' for adjusting the slider 18 of the zero adjusting potentiometer and the switches 19, 22, respectively, are arranged at the bottom of the panel, with the switches 4 and 12 below and at opposite sides of the instrument 2.

As shown in Fig. 5, only the upper portion of the tube 1 extends above the panel 25 which, preferably, is of insulating material. The tube is shielded, up to the panel level, by a shield 26 of the usual type. Only the admittance of the tube 1 is connected across the circuit under test at all measuring ranges, and the capacitive and resistive load imposed across that circuit is thereby held at an absolute minimum. A short lead 8 is illustrated in Fig. 2 as the capacitance of the leads should be kept low for high frequency measurements. A set of leads of different lengths and with various types of terminals will usually be provided to adapt the voltmeter for the testing of various circuits and devices.

The method of obtaining the several measuring ranges with a circuit such as shown in Fig. 1 will be apparent from the curves of Figs. 3 and 4. The several curves $1E_p$, $2E_p$, etc. of Fig. 3 are a family of total space current-grid voltage curves for different values of plate voltage. The total space current includes both the plate and screen grid current when the circuit arrangement of Fig. 1 is used. Assuming that the measuring instrument 2 has a full scale deflection at 100 microamperes, the change in grid voltage which will produce a 100 microampere change in the total space current will depend upon the steady potentials impressed upon the tube electrodes. When operating on curve $1E_p$, with the grid bias set at −4 volts, the slope of the characteristic at the operating point P1 is such that a space current change of value A is produced by a grid bias swing B1 of about 0.25 volts. The normal space current when operating at point P1 is 1100 microamperes and, for direct reading, the reverse current flow through instrument 2 must be set at 1100 microamperes by adjustment of slider 18. The selection of other values for the plate voltage and grid bias will result in operation of tube 1 on characteristics of different slope and the fixed value A of space current change will be developed by other values, such as $B_2$ and $B_6$, of grid voltage swing. For the particular curves of Fig. 3, the second measuring range $B_2$ at plate voltage $2E_p$ and a bias of $-7.1$ volts for operation at point $P_2$ is from 0 to 0.9 volt when the value A of 100 microamperes gives a full scale deflection on instrument 2. The reverse current through instrument 2 must be set at 420 microamperes to bring the instrument reading to zero when operating about point $P_2$. At the sixth range, as represented by curve $6E_p$, the voltage swing $B_6$ about operating point $P_6$ must be 8 volts to produce the space current change A of 100 microamperes.

The measuring range of the voltmeter may thus be adjusted by an appropriate selection of the energizing potentials of tube 1 to determine the slope of the characteristic about the selected operating points. The curves of Fig. 4 illustrate the relationship between meter deflection (microamperes change in space current flow) when the tube characteristics at the several ranges provide a total change in space current flow at the indicated top scale values of from 1.2 to 16 volts. It will be noted that the tube 1 is biased below cutoff at the 12 and 16 volt ranges, and the minimum scale graduations for these ranges are therefore well above zero, the "low" graduation on the 16 volt range being 8 volts.

The resistance network of Fig. 1 will be designed in accordance with the number and the relative magnitudes of the several voltage ranges that are to be measured. The grid bias and the plate, or plate and screen grid, voltages are simultaneously adjusted to select the appropriate characteristic and the operating point on that characteristic. The network also provides an approximate adjustment of the reverse current through instrument 2 to the appropriate value as contact arms 19 and 22 are adjusted by knob 23', and the exact adjustment to zero is made by the slider 18. The meter is best adjusted to zero position by first removing the jumper 9 from the jack 10 and control grid cap of tube 1, thus insuring that there is no alternating voltage across the input elements of the tube.

The apparatus, as shown in Figs. 1 and 2, is adjusted for measurement in the 8 volt range. The portion of resistance 21 between the switch contact arm and ground lead 6 determines the positive voltage which is placed on the cathode, and thus fixes the negative bias on the control grid. When the meter reading is brought accurately to zero position by an adjustment of tap 18 on the resistor 17, the voltages $e$ impressed upon the tube 1 will produce meter deflections, or a direct current flow through the meter 2, as indicated by the "8V range" curve of Fig. 4. A full scale deflection on this range corresponds to an 8 volt alternating current input to the tube 1 since, as indicated by the curve, this input voltage establishes a direct current flow through the meter 2 of 100 microamperes. If the apparatus is now adjusted for operation on the 6 volt range, the grid bias is reduced and the plate voltage is increased to effect operation upon a characteristic of sharper slope. The graduated scales for the lower voltage ranges extend down to zero but the graduations on the upper ranges are not completed to zero since, as shown by the Fig. 4 curves, there is a finite lower limit of voltage input $e$ below which there is no deflection of the meter pointer. The outer scale of the multi-range scale of meter 2 is preferably graduated in values corresponding to the 1.2 volt range to facilitate the reading of small voltage values.

The 1.2 volt range curve of Fig. 4 shows a current flow through meter 2 of about 3 microamperes for an alternating input voltage of about 0.1 volt, and this current flow will produce a significant deflection of the meter pointer. The described apparatus therefore provides for the measurement of alternating current voltages of from 0.1 to 16 volts.

It is particularly to be noted that at all voltage ranges only the admittance of the tube 1 appears across the circuit component under measurement. Furthermore, the condenser bank 14—16 constitutes a network which preserves a capacitive reactance over a wide range of frequencies of from about 40 cycles to 50 megacycles and the voltage readings are, except for interelectrode capacities within tube 1, substantially independent of frequency. Some error is introduced by these interelectrode capacities at the higher frequencies, but the accuracy is comparable with that of other types of measuring instruments at these higher frequencies.

The described embodiment is to be understood as illustrative of an invention which may be incorporated in other physical forms and circuit arrangements for use at the same or other voltage ranges. So far as I am aware, it is broadly new to construct a multirange vacuum tube voltmeter which includes a single tube and a single measuring instrument, of single or of multirange resign, and in which the voltage range of measurement is selected by adjusting the direct current potentials applied to the tube elements.

The effective range of the voltmeter may be extended, in the known manner, by inserting a voltage divider between the circuit under test and the voltmeter when the load impressed upon the circuit by the voltage divider does not materially alter the current flow in that circuit. These means for increasing the measuring range may be satisfactory in special cases but the principal advantage of the invention results from the circuit arrangements by which only the admittance of the tube 1 is imposed upon the circuit under test at all voltage range adjustments.

It is therefore to be understood that the invention is not restricted to the specific embodiment herein described and that various changes may be made in the several circuit elements, their relative values and relationships, without departing from the spirit of my invention as set forth in the following claims.

I claim:

1. In a vacuum tube voltmeter, the combination of a multielement vacuum tube, a measuring instrument in an output circuit of said tube, said instrument including a pointer movable over concentric scales of different ranges of voltage values, means for applying direct current energizing potentials to the elements of the tube, and means for impressing the unknown voltage to be measured across the input elements of said tube, of means to adjust to different orders of magnitude the current change produced in said output circuit by the impressed unknown voltage, thereby to determine the range of voltages indicated by the deflection of the pointer of said measuring instrument, said adjusting means comprising means for altering the energizing potential impressed upon at least one of the elements of said tube.

2. The invention as claimed in claim 1, wherein said adjusting means include means for simultaneously altering the energizing potentials applied to a plurality of the elements of said tube.

3. The invention as claimed in claim 1, wherein said tube is a variable mu tube having a plate current cut-off at a high negative value of control grid bias, and said adjusting means includes means for altering the control grid bias to predetermined spaced values, thereby to adjust the plate current flow for a given voltage input on said tube to substantially different orders of magnitude.

4. In a vacuum tube voltmeter, a multielectrode vacuum tube including a control grid and plate cooperating with a cathode, means for impressing a voltage to be measured between cathode and control grid, a source of direct current and a resistance network for impressing energizing potentials upon the electrodes of said tube, an output circuit for said tube including an instrument for measuring plate current flow, adjustable means included in said resistance network for shifting the energizing potentials applied between two of said tube electrodes between two values to determine the measuring range of the voltmeter, and means adjustable to set the pointer of said instrument at zero position for either of the energizing potentials applied between the said two tube electrodes.

5. A multirange vacuum tube voltmeter comprising a vacuum tube having a control grid electrode cooperating with a plate electrode and cathode, means for impressing direct current energizing potentials between said cathode and the respective electrodes, means for impressing a voltage to be measured between said control grid and cathode, an instrument connected between said plate and cathode for measuring plate current flow, means adjustable to establish a reverse current flow through said instrument to set the pointer thereof to zero position at zero input voltage across said control grid and cathode, and means adjustable to vary between different orders of magnitude the ratio of plate current flow to the voltage impressed between said control grid and said cathode, thereby to determine the range of voltages to be measured by said instrument, said means comprising elements adjustable to control the energizing potential impressed between the cathode and one of said electrodes.

6. A multirange vacuum tube voltmeter as claimed in claim 5, wherein said range determining means includes means for altering the energizing potential between the cathode and one electrode of said tube and means for simultaneously altering the said adjustable means for establishing a reverse current flow through said instrument.

7. A multirange vacuum tube voltmeter of the type including a vacuum tube having a control grid cooperating with a plate and a cathode, an ammeter for measuring plate current flow established in said tube by an input voltage impressed between said cathode and anode, and means adjustable to determine the range of input voltages measured by said instrument, characterized by the fact that a capacitive network is permanently connected between the control grid and cathode, said network having a capacitive reactance over a frequency range of from about 40 cycles to about 50 megacycles.

8. A vacuum tube voltmeter of the type including a vacuum tube having a control grid and plate cooperating with a cathode, means for impressing the voltage to be measured between the cathode and grid of said tube, an ammeter for measuring the space current flow established in said tube, a reverse current circuit for establishing in said ammeter a current flow to set the ammeter needle at zero position for zero input voltage on said tube, and means for impressing energizing potentials between the cathode and respectively the plate and grid of said tube, characterized by the fact that said energizing means includes elements adjustable to shift the operating point of said tube to different preselected slopes of the grid voltage to space current characteristic, whereby a given voltage impressed between the tube grid and cathode establishes space current flow of substantially different magnitudes in accordance with the selected operating point determined by the setting of said adjustable elements.

9. In a vacuum tube voltmeter, the combination with a variable mu vacuum tube of the type including a cathode, a control grid, a suppressor grid, a screen grid and a plate; means connecting said cathode to said suppressor grid and connecting said plate to said screen grid; and a microammeter connected between the plate and cathode; of adjustable means for impressing direct current energizing potentials of different preselected magnitudes between said cathode and, respectively, said control grid and said plate, thereby to adjust to different orders of magnitude the space current flow established between the plate and the cathode by a given voltage impressed between the control grid and cathode.

10. The invention as claimed in claim 9, in combination with means adjustable to set the pointer of said microammeter to zero position at each adjustment of said potential impressing means.

11. A vacuum tube voltmeter of the type including a vacuum tube having a control grid cooperating with a plate and a cathode, an instrument connected between the plate and cathode for measuring the space current flow produced by a voltage impressed between said cathode and control grid, and means adjustable to set the pointer of said instrument to zero position, characterized by the fact that means is provided for altering the direct current energizing potentials impressed between the tube electrodes, thereby to determine the effective measuring range of said voltmeter.

12. A multirange vacuum tube voltmeter comprising a multi-element vacuum tube, means for impressing the voltage to be measured upon input elements of the tube, an instrument for measuring the output current resulting from the impressed voltage, and tube energizing means placing direct current potentials upon the tube elements; said tube energizing means comprising a source of direct current voltage, adjustable means between said source and tube for setting the potentials of the tube elements to different values to determine the measuring range of the voltmeter, and a gaseous discharge tube connected across said source to maintain the potentials on the tube elements independent of voltage fluctuations of said source.

13. A vacuum tube voltmeter comprising a vacuum tube having a control grid connected to a cap terminal, an instrument for measuring the space current flow of said tube, a panel on which said instrument is mounted, input terminals for said voltmeter comprising said cap terminal and a ground terminal, means beneath said panel for energizing said tube, said panel having an opening through which the top end of said tube is exposed, and shield means for the portion of the tube below said panel.

14. The invention as claimed in claim 13, wherein means is mounted on said panel for adjusting the measuring range of said voltmeter.

15. The invention as claimed in claim 13, wherein means is mounted on said panel to adjust the energizing potentials applied to said tube, thereby to control the measuring range of said voltmeter.

16. In a vacuum tube voltmeter, a panel having an opening therethrough adjacent one edge thereof, a tube having a control grid terminal projecting above said panel, means shielding the portion of the tube below said panel, said tube having a control grid cooperating with a cathode and plate, an instrument on said panel for measuring space current flow through said tube, and means for impressing a voltage to be measured between the control grid and cathode of said tube.

17. The invention as claimed in claim 16, in combination with means for adjusting the energizing potentials applied to said tube, said adjusting means including means mounted on said panel for manual adjustment to select the energizing potentials impressed upon the tube.

18. In a vacuum tube voltmeter, a panel upon which adjustable devices may be mounted, a vacuum tube having a control grid terminal projecting above said panel, said tube including a control grid cooperating with a cathode and plate, means beneath said panel for impressing energizing potentials upon said tube, an instrument on said panel for measuring space current flow in said tube, and a grid return circuit between said control grid and cathode; said circuit including a resistance adapted to be connected to said cathode, and a removable lead for completing a circuit between said resistance and said control grid.

19. A voltmeter as claimed in claim 18, wherein said circuit includes a pin jack mounted on said panel, and said lead has a pin terminal for insertion in said pin jack and means for connection to the control grid terminal of said tube.

20. A voltmeter as claimed in claim 18, wherein said circuit includes a manually operable switch.

OLIVER JAMES MORELOCK.